United States Patent Office

2,785,077
Patented Mar. 12, 1957

2,785,077

DESICCATION OF LIQUIFORM FOOD PRODUCTS

Vern F. Kaufman, Lafayette, Calif., assignor to the United States of America as represented by the Secretary of Agriculture No Drawing. Application March 4, 1954,
Serial No. 414,236

18 Claims. (Cl. 99—206)

(Granted under Title 35, U. S. Code (1952), sec. 266)

A non-exclusive, irrevocable, royality-free license in the invention herein described for all governmental purposes, throughout the world, with the power to grant sublicenses for such purposes, is hereby granted to the Government of the United States of America.

This invention relates to the dehydration of liquid foodstuffs, such as fruit and vegetable juices, particularly tomato juice. The objects of this invention concern the provision of processes for dehydrating such materials whereby to obtain solid dried products which are characterized by many advantageous properties, as follows: the products are of a free-flowing nature and do not gum or coalesce when exposed to air for reasonably long periods of time but retain their free-flowing characteristics; the products have an expanded, sponge-like porous structure whereby they are easily broken up into crystalline granular particles and whereby they exhibit a high rate of rehydration when stirred with water to prepare a reconstituted juice; and the products retain essentially all the flavor and nutritive value of the original juice so that the reconstituted juice prepared from the dry products tastes essentially the same as the freshly prepared juice and has the same content of vitamins and other nutritive values. A particular object of the invention is the provision of methods whereby to ensure expansion of the material during the dehydration cycle thus to obtain accelerated dehydration and to obtain a porous product which can be readily rehydrated. Additional objects and advantages of the invention will be obvious from the description herein.

The successful dehydration of fruit and vegetable juices, purees, etc. presents a difficult problem—difficult because of the complex nature of these materials and the many factors which must be taken into consideration. Some of the more important aspects which must be considered in any juice dehydration procedure are as follows:

(1) The natural odor and flavor of the product must be retained as much as possible to obtain a high quality product. This requires careful control because of the delicate nature of the constituents which give the material its distinctive flavor.

(2) The procedure must avoid formation of off-flavors and odors, otherwise the natural taste of the product will be impaired or completely masked. Thus fruit and vegetable juices contain many constituents which are potentially reactable to produce bad-flavored end products, for example, reducing sugars and nitrogen-containing compounds which are capable of reacting to form products of undesirable odor and flavor.

(3) The nutritional components of the juice must be retained. Some of the nutritive components, such as vitamin C, are sensitive to heat and precautions must be taken that these valuable constituents are not destroyed.

(4) The natural color of the product must be preserved as much as possible as consumers demand products of natural color. Further, color is often an index to development of off odors and flavors because the reaction of reducing sugars with nitrogenous constituents (browning reaction) gives rise to highly colored products of undesirable odor and flavor.

(5) The final dry product must have suitable characteristics for ultimate use. Thus the product must be free-flowing and be readily rehydratable on mixing with water to make a reconstituted juice. Fruit and vegetable juices contain sugars which induce formation of sticky and gummy dried products, therefore the preparation of free-flowing, easily rehydratable products is very difficult.

(6) In addition to the above quality considerations, the procedure must be economically feasible, thus the apparatus required, time for processing, and so forth must be kept within reasonable limits.

Many different procedures have been advocated for dehydrating fruit and vegetable juices. None of them approach the ideal of meeting all the requirements. For example, freeze-drying procedures which involve sublimation of moisture from a frozen mass of the juice are effective from the standpoint of retaining natural flavor and odor but have the disadvantage of requiring expensive equipment and long processing times because sublimation from the solid state is a much slower process than evaporation from the liquid state. Further, to obtain sublimation one must use very high vacuum, that is, pressures on the order of 10–100 microns of Hg. Apparatus for creating and maintaining such high vacuum is very expensive initially and costly to operate.

Spray drying procedures have been advocated for dehydration of fruit and vegetable juices. Although spray drying is successful in many applications as in drying milk, eggs, soaps, detergents, etc., its use in connection with fruit and vegetable materials where the end products are highly hygroscopic is beset with many complications. For example, tomato juice powder must be collected at a temperature below its sticky point temperature, otherwise the powder coalesces. This requisite low exhaust temperature automatically limits the range of inlet temperatures whereby the amount of juice fed per unit time is necessarily limited. Another consideration is that the inlet temperature also must be limited to prevent heat damage to the juice and powder. Another point is that the dried powder is in contact with the exhaust air stream which necessarily contains water vapor evaporated from the original juice. The relative humidity of the exhaust stream must be kept low to minimize re-absorption of this moisture by the powder. Adjustment of the conditions of drying to decrease the relative humidity of the exhaust air likewise limits the amount of juice treated per unit time. These factors of sticky point and possibility of re-absorption of moisture necessitating limitation of inlet temperature, exhaust temperature and feed rate all add up to the fact that spray drying of fruit and vegetable materials is not rapid and efficient as with spray drying of non-hygroscopic materials such as eggs, milk, soap, etc. Another point to be made is that spray drying has the disadvantage that the juice particles are subjected to huge volumes of heated air which means that the opportunity for oxidation with consequent development of off odors and flavors is greatly increased. In addition the small beads or bubbles of dry product formed by spray drying do not reconstitute as rapidly as desirable. Thus these beads tend to aggregate on contact with water so that reconstitution of such products requires many minutes of rapid agitation with water.

The procedure in accordance with this invention fulfills all the requirements for the successful dehydration of fruit and vegetable juice purees. Thus some of the advantages and features of the invention are as follows:

(a) The natural odor and flavor of the edible liquid are not impaired and further no detectable amount of off-odor or flavor is developed. Thus the final product upon reconstitution forms a juice, puree, etc. which can scarcely be distinguished from the natural material.

(b) The natural color of the liquid is retained—no browning or other development of unnatural color takes place.

(c) The dry product is free-flowing and has an extremely rapid rate of reconstitution. Thus to make a reconstituted juice, the necessary amount of water is added to the dry product and stirred. In 30 seconds or less the product is completely dispersed and the juice ready to serve. In this regard a reconstituted juice can be prepared in about the same time as required for reconstituting the concentrated frozen juices which are now enjoying such popularity. In contrast, spray dried products require stirring with water for 3 to 5 minutes or more to get a reconstituted juice. The product of this invention has an extremely high rate of rehydration because it is made up of a mass of expanded, porous, sponge-like particles and the water can rapidly enter into the interstices and dissolve the soluble material; the product is completely free from the aggregating tendency which is common to spray dried products.

(d) The dehydration process of this invention does not cause destruction to the vitamin content of the original juice. Thus the nutritive value of the juice is completely retained.

(e) The dehydration in accordance with the instant invention requires a comparatively short period of time—on the order to 1 to 3 hours with batchwise operation and much less time in continuous operation. This of course is a drastic improvement over freeze-drying which because of the relative slowness of sublimation requires 8 to 12 or more hours.

(f) The dehydration is accomplished under vacuum. This means that little opportunity for oxidation and subsequent formation of off-odors and flavors is afforded. This of course is in sharp contrast to spray drying where each particle of juice is contacted with a large excess of hot air.

(g) In our process quantitative yields of product are obtained. All the solids content put into the process is recovered. This is in sharp contrast to spray drying of fruit or vegetable juices where even under the best conditions anywhere from 5 to 20% of the product remains clinging to the walls of the spray drier chamber or the cyclone collector, requiring frequent shut-downs for cleaning.

(h) The product in accordance with this invention does not require refrigeration but can be stored at ordinary room temperatures or higher for very long periods of time with no loss of quality. Further, packages of the product need not be reconstituted all at once. A desired amount may be removed from the package for reconstitution and the package re-sealed until more of the product is needed. The free-flowing nature of the product contributes to the ease with which aliquots may be removed from the package as desired.

In the patent application of Sumner I. Strashun, Serial No. 291,817, filed June 4, 1952, there is disclosed a process for dehydrating fruit juices and other edible liquid materials of plant origin which involves concentrating the juice then dehydrating the liquid concentrate by maintaining it in contact with a heated surface while being exposed to vacuum, the conditions of temperature being controlled to get rapid dehydration without damage to the product. A primary advantage of the aforesaid process is that drying under vacuum in contact with a hot surface results in a puffing or expansion of the material during dehydration, this expansion being caused by the entrapment of a multitude of small steam bubbles throughout the mass. This expansion is very desirable as the final product is then in a porous form due to the presence of numerous small voids. The product thus is easy to remove from the trays, breaks up easily into small particles or flakes and exhibits an extremely high rate of rehydration so that a reconstituted juice can be prepared by agitating with water for less than one minute. The expansion of the product also has the advantage that it accelerates the rate of dehydration. Thus when the material expands, moisture can diffuse out of the mass very readily so that dehydration is completed in a short time. Such favorable action cannot be obtained if the material would remain constant in volume or shrink during dehydration—in such case moisture diffuses slowly through the dense mass and dehydration requires a long period of time—as much as ten times longer than where extensive expansion is obtained. A further advantage of expansion during dehydration is that in the expanded condition there is a pronounced evaporative cooling effect so that the temperature applied for dehydration can be high to get rapid dehydration without overheating the product. Where there is no expansion, the evaporative cooling effect is minor and dehydration temperatures must be kept low to prevent overheating—as a result the dehydration time is greatly extended.

It has been observed that in some instances, depending on the type of liquid foodstuff and its manner of preparation, expansion to a desirable extent does not take place when proceeding in accordance with the above-outlined technique. In some cases, expansion will occur initially but the material will eventually collapse forming a dense leathery product. These difficulties are particularly noticed with tomato juice and other liquid foods which are high in pulp content. In accordance with the patent application of S. I. Strashun and W. F. Talburt, Ser. No. 334,384, filed January 30, 1953, this difficulty may be overcome by removing all or part of the pulp from the juice prior to dehydration. Although this procedure operates satisfactorily, it has the disadvantage that it necessitates the additional step of separating pulp from the juice and further the de-pulped juice and pulp must be separately dehydrated and eventually mixed together.

It has now been found that vacuum dehydration can be successfully applied to tomato juice and other liquid foods of high pulp content without removal of the pulp. The manner in which this is done is explained as follows. The liquid food, such as tomato juice, is concentrated and then preferably gasified as by beating air into it. The concentrate is then subjected to vacuum dehydration without application of heat. After the concentrate has become partly dehydrated under such conditions, heat is applied and dehydration is completed under conditions of heat and vacuum.

The initial stage of dehydration—application of vacuum without application of heat—is an important factor in the process of this invention. Thus when the gasified concentrate is subjected to the vacuum, the concentrate quickly expands in volume primarily by expansion of the gas bubbles dispersed throughout the concentrate. As the process continues evaporation of moisture takes place and the concentrate decreases in temperature because of the cooling effect of the evaporation. The combination of reduction in moisture content and decrease in temperature causes the concentrate to become a stiff plastic material which holds its expanded form because it retains bubbles of fixed gas or water vapor throughout its mass. Such action is in contrast to that obtained when concentrates of tomato juice and other liquid foods of similar properties are subjected to both heat and vacuum. In such procedures, the concentrate will puff initially but will then collapse and eventually dry to a leathery mass which exhibits very poor rehydration qualities due to its dense nature. It is believed that such undesirable results are due to the fact that the increased temperature coupled with the still high moisture content of the concentrate cause the concentrate to become so fluid that it does not have the ability to retain bubbles of gas or water vapor but these bubbles escape from the concentrate much as steam escapes from boiling water and as a result the concentrate collapses in volume. However when proceeding in accordance with this invention, the concentrate is maintained in such condition that it entraps the gas and water vapor bubbles just as carbon dioxide bubbles are retained in bread dough.

In proceeding in accordance with this invention, after the initial stage of dehydration with vacuum but without application of heat, heat is applied so that dehydration may be completed rapidly and efficiently. Application of heat at this stage does not cause collapse of the expanded concentrate because of several factors. The first is that the concentrate has been partially dehydrated, its temperature is low, and it has assumed a stiff plastic texture. When heat is applied, the temperature of the concentrate rises gradually. However this rise in temperature does not cause the concentrate to lose its rigidity or to release the entrapped bubbles because the material has become drier during the period of increasing temperature. Thus the drying effect compensates for the rise in temperature. As a result the concentrate remains in an expanded condition throughout the entire drying cycle.

In applying this invention in practice the following steps are applied:

The liquid foodstuff to be dehydrated is first prepared or otherwise obtained. For example in applying this invention to liquid fruit or vegetable products, an edible liquid material of plant origin may be prepared by reaming, pressing, macerating, crushing, comminuting or extracting with water the edible portions of fruit or vegetables as for example orange, grapefruit, lemon, lime, apple, pear, apricot, strawberry, raspberry, pineapple, grape, prune, plum, peach, cherry, tomato, celery, carrot, spinach, lettuce, and so forth. The liquid preparation may be clear, contain suspended pulp or may even be thick like a puree. It is obvious that to make a high quality dehydrated product, the liquid preparation should be made from ripe, sound produce of high quality.

The edible liquid is then subjected to concentration so that it will be in proper condition for the subsequent dehydration step. A single-strength juice cannot be subjected directly to dehydration because it will boil and spatter violently. On the other hand when the concentrate is applied in the dehydration it expands by entrapping steam bubbles and little boiling or spattering is obtained. In general the liquid is concentrated as much as possible to still obtain a material of fluid character. Thus the subsequent dehydration step necessitates starting with a liquid concentrate but to decrease expense and time of dehydration as much moisture as possible should be removed during the concentration step to the point of obtaining a concentrate which is still capable of flowing. In many cases a satisfactory concentrate will have a density about from 35 to 80° Brix. Depending on the degree of concentration and the proportion of suspended pulp, the concentrate may be of a sauce-like or even pasty consistency. Any such materials are considered as being liquids since they have fluent properties. As conventional in the concentration of fruit juices and similar products, it is preferred to conduct the concentration under vacuum at a temperature not over about 50–150° F. in order to avoid heat damage to the material.

The concentrate may then be homogenized by passing it through a colloid mill or similar apparatus used for performing homogenization. It has been observed that with some juices such homogenization has the advantage that when the final product is reconstituted there is produced a juice in which the pulp particles are uniformly dispersed throughout the reconstituted liquid as minute particles and which remain suspended in the liquid just as is the case with a freshly prepared juice. Where homogenization is not used with such initial materials, the reconstituted juice contains agglomerated pulp particles which tend to settle rapidly so that the reconstituted juice does not have the appearance nor the consistency of the freshly prepared juice. Whether or not homogenization is required with any particular liquid food will depend on the fruit or vegetable from which it is derived and on the mode by which it was prepared. In any particular case a pilot dehydration on a small scale of a sample of the material can be applied to determine whether or not homogenization is required.

The concentrate is then gasified, that is, air or a nontoxic inert gas such as nitrogen or carbon dioxide is incorporated into the concentrate. The gasification has the desirable effect of enhancing expansion of the concentrate during vacuum dehydration. Thus when vacuum is applied the particles of gas dispersed throughout the body of the concentrate expand and so cause the entire mass of concentrate to expand thereby forming a porous mass many times the volume of the original concentrate. For the dispersion of gas into the concentrate many different types of apparatus may be used. A simple expedient is to subject the concentrate to a rotating wire whip which beats air into the concentrate. Another plan is to pump the concentrate through a conduit, a portion of which is of restricted cross-section to provide a venturi, the gas being introduced at the zone of high velocity and low pressure within the venturi and so thoroughly commingled and dispersed with the concentrate. Another plan is to place the concentrate in a sealed vessel and pump the gas under pressure through a perforated false bottom into the concentrate. A simple technique for adding air is to stir the concentrate with an agitator which periodically rises out of the level of liquid and in its return to the liquid forces air into it and beats this air into the concentrate. Another system is to stir into the concentrate some of the dehydrated final product from a previous run. This product being in an expanded, porous condition comprises a matrix of solid material with numerous voids dispersed throughout the solid matrix. These voids being actually filled with air, stirring of the dehydrated material into the concentrate furnishes a simple and effective way of incorporating air. Another technique involves adding a quantity of solid carbon dioxide (Dry Ice) in small pieces to the concentrate and then subjecting the mass to agitation to cause the carbon dioxide released as a gas to be thoroughly incorporated into the concentrate. This has an additional advantage that the solid carbon dioxide causes cooling of the concentrate whereby more gas is absorbed than would be at room temperature. Regardless of the technique of gasification used, it is preferable to cool the concentrate before or during the gasification thus to cause the concentrate to absorb a greater quantity of the gas. Thus in conducting the gasification by whipping in air, the vessel in which the whipping is carried out may be provided with a jacket through which a cooling medium is circulated. In the alternative, the concentrate may be chilled in a refrigerator prior to the whipping operation. To reduce the size of the gas particles in the concentrate the concentrate after having the gas dispersed by use of agitators or the like may be passed through a colloid mill. If the latter technique is used then the concentrate need not be homogenized prior to gasification. In many cases, gasifying the concentrate to the extent of providing an overrun of about 10 to 50%, preferably 20 to 40%, gives optimum results from the standpoint of causing adequate expansion during dehydration without forming a dried product of too low a bulk density. If products of a lesser bulk density are desired, the overrun may be increased above the aforementioned levels as needed.

The gasified concentrate may then be subjected to chilling to prepare it for vacuum dehydration. The step of chilling has the desirable effect of thickening the concentrate so that when the vacuum is applied the gas particles can escape less readily from the mass with the result that permanent expansion in volume is assured. When chilling is employed, it should be performed immediately following gasification to prevent undue loss of the gas incorporated into the concentrate. The chilling is also preferably accomplished rapidly as by subjecting the concentrate to a blast of very cold air. Such rapid chilling also is desirable to prevent escape of the gas particles. If dehydration is to be accomplished in a vacuum shelf drier, it is convenient to chill the concentrate right in the trays eventually to be placed in the drier. To this end the concentrate is poured into the trays and the loaded trays are subjected to refrigeration to reduce the temperature of the concentrate to about 0° to 30° F., preferably 10–20° F. The particular temperature to be used will vary depending on the nature of the product in question and on the degree of concentration. The aim is to reduce the temperature of the concentrate so that it becomes thicker in consistency but is still fluid in character and not frozen solid. By retaining the fluid nature of the concentrate, it can then expand when vacuum dehydration is applied. Such expansion could not possibly take place if the concentrate were to be frozen solid. In such case the freezing would set the volume of the concentrate and it could not possibly expand. Since the freezing point of the concentrate is dependent on its concentration of soluble solids it is evident that the higher the solids content of the concentrate the lower can be the temperature reached during chilling without actually freezing the material.

To prevent loss of gas which has been incorporated into the concentrate, the dehydration should be initiated immediately following the gasification step or immediately following the chilling step when this alternative step is applied. In conducting the vacuum dehydration, various types of apparatus suited for batchwise or continuous operation may be employed. For illustrative purposes, the following description explains the procedure when using a batch-type vacuum shelf drier.

Trays containing the concentrate are introduced into a vacuum drier equipped with hollow shelves through which heating or cooling media may be circulated. In loading the trays initially one must take into account the fact that the concentrate will expand considerably during drying. For this reason the level of concentrate in the trays must be low enough to allow for the 10-20 fold expansion without causing the expanded material to rise high enough to contact the shelf above each tray. After the trays are loaded into the drier, the drier is closed and the vacuum applied, the vacuum being maintained until dehydration is completed. Usually a pressure of about 1 to 10 mm. of Hg, preferably below 3 mm., is used. Vacuums in this range are easy to obtain with relatively inexpensive equipment such as steam ejectors and require pumping of relatively small volumes of water vapor as compared with systems using vacuum on the order of several microns where very expensive efficient vacuum pumps, Dry Ice traps, etc. are essential. As described hereinabove, during the initial stage of dehydration, no heat is supplied to the drier so that the initial temperature of dehydration is simply room temperature. During this stage of the dehydration the concentrate expands substantially in volume. Depending on the type of product involved, the amount of gas incorporated in the concentrate and the degree of vacuum, the expansion may be anywhere from 3 to 20 times the original volume of the concentrate. Under most favorable conditions the expansion is about 10 to 20 times the original volume. Further in this stage, the concentrate becomes partly dehydrated, its temperature decreases due to the cooling effect of the evaporation of moisture, and the concentrate thickens in body assuming a stiff plastic condition sufficient to retain its expanded form. In most cases when the concentrate temperature falls below 32° F., preferably to about 0° F. to 20° F., the concentrate is in such condition that its expanded volume is permanently set and heat can be applied to accelerate evaporation of moisture without causing collapse of the expanded concentrate. Thus a convenient method for ascertaining the point when the concentrate is in the condition in which heat can be applied without causing collapse involves measurement of the temperature of the concentrate as the vacuum dehydration proceeds. In conducting the dehydration in vacuum tray drier or similar apparatus, usually this point is reached when the pressure within the drier has decreased to the low level desired for conducting the dehydration. At any rate when the point is reached when the concentrate can be heated without collapse, a heating medium is circulated through the hollow shelves of the drier. The temperature of the shelves may, in general, be held in the range from about 100 to 200° F. In any case, the temperature should not be increased to such a high level as to cause collapse of the expanded concentrate nor damage to the flavor and color of the material. The maximum temperature which can be tolerated with any particular concentrate can be easily determined by conducting a pilot run on a sample of the material in question. A preferred technique which has the advantages of obtaining rapid and efficient dehydration without collapse of the expanded state of the concentrate and without damage to the flavor or color of the concentrate involves applying heat at two different levels. Thus after the initial dehydration stage with no applied heat, the temperature of the shelves is raised to a relatively high level on the order of about 150 to 200° F. to cause rapid evaporation of moisture. Then when the temperature of the concentrate approaches the range from about 100° to about 150° F., the temperature of the shelves is decreased to this same level and maintained at this level until the dehydration is completed. When proceeding according to this technique, dehydration is initially forced at a high rate by the application of a high temperature to the shelves. During this period the evaporative cooling effect is great so that the temperature of the product remains well below the temperature of the shelves hence no collapse nor damage to the concentrate occurs despite the high temperature applied. However as the dehydration proceeds, the rate of evaporation necessarily falls off with the result that the temperature of the concentrate starts to rise. When the temperature of the concentrate rises to a level of about 100° to 150° F. the shelf temperature is decreased to this same level so that further rise in the temperature of the concentrate is prevented. Thereby collapse of the expanded concentrate or damage to its color or flavor is prevented. As noted above, the second period of the dehydration with applied heat involves applying heat at a temperature from about 100 to about 150° F. The particular temperature within this range to be used in any specific instance will depend on the nature of the material being dehydrated. Thus for a product which would be damaged if it were heated to above 125° F., the product temperature during dehydration would be checked from time to time and when it approached 125° F., the shelf temperature would be reduced from the initial high temperature to 125° F. and maintained at that level until dehydration would be complete. A different product might be damaged, say, if it were heated to above 100° F. In such case the second stage of dehydration would be conducted at 100° F. so that the temperature of the product would not exceed that level. It is evident that adaptation of the process to any particular material involves the factor of maintaining the product temperature below the level at which collapse or damage to the flavor or color would occur. During the first period of dehydration with applied heat, as high a temperature should be applied to get as rapid a dehydration as possible, then when the product temperature approaches the temperature at which collapse or damage would occur, the temperature applied by the shelves should be dropped so that during the remainder of the dehydration, the temperature of the product is maintained below the temperature at which collapse or damage to flavor or color would occur.

When the drying cycle is complete and the product has been reduced to the desired moisture content, usually about 5% moisture content or less, the product is cooled before breaking the vacuum by circulating cold water through the drier shelves. This cooling causes the product to lose its plastic character and become brittle and easily friable. As a consequence when the vacuum is released the cooled product maintains its expanded volume and is easy to remove from the trays and easy to break up into small particles. Thus after the product is cooled, the vacuum is released, the drier is opened and the trays are removed. The dry product is then easily removed from the trays by applying a spatula to the trays; the action of the spatula causes the product to be broken up into a mass of fine crystalline flakes. For optimum results it is preferred that the vacuum drier be located in a room in which the atmosphere is regulated at a very low humidity; this will reduce any possibility of moisture regain by the product.

Instead of carrying out dehydration in a batch-type vacuum drier as described above, one may employ a continuous dehydrator such as a belt-type vacuum drier. A suitable apparatus of this type includes an endless flexible metallic belt which travels about two drums, one being heated internally by steam or hot water and the other being cooled by internal circulation of cold water. The belt, drums and associated mechanisms are all located within an air-tight vessel which can be evacuated. A film of the gasified concentrate which may be chilled as previously described, is applied to the outer surface of the belt by a roller device or other feeder. This film of concentrate is then initially transported by the belt while not subjected to any heating. During this stage of dehydration the concentrate is expanded and dehydrated to such an extent that when the film is later subjected to heat by the thermal contact with the heated drum, the concentrate will remain in an expanded condition. It is evident that in operating a continuous dehydrator of this type the speed of the belt and the thickness of the film of concentrate should be so correlated that when the concentrate comes into thermal contact with the hot drum, sufficient evaporation has taken place so that the expanded concentrate will not collapse but will remain in its expanded condition. In any event dehydration in the continuous type of drier will operate on the same principles as with the batch-type apparatus in that the concentrate is first dehydrated without application of heat, then with application of heat as the partially dried concentrate is transported by the belt over the heated drum, which is maintained at for example about 100° to 150° F. Additional heaters in the way of radiant heaters or steam heated platens may be used to provide additional heating necessary to get complete dehydration of the concentrate. The dried product is then transported by the belt about the cooled drum whereby the dried product is cooled to make it lose its plastic character. The cooled product is then scraped off the belt by a doctor blade and is removed from the dehydrator through an air-lock type of receiver.

In the dehydration of some fruit juices, purees, etc., it may be necessary to make some provision for returning volatile flavoring materials which are vaporized during concentration and/or dehydration. In the case of tomato and apricot products such provisions are not necessary as the dehydrated product retains its natural flavor and odor. In the case of orange, apple, pineapple, strawberry, raspberry, and many other fruit products, provision should be made to restore flavoring substances to obtain a high-quality product. The restoration of flavor may be carried out in several different ways. In one technique, the volatile flavoring component is mixed with molten, supercooled sorbitol and the mixture allowed to crystallize. The sorbitol containing absorbed flavoring material is then incorporated with the dehydrated juice to furnish the approximately original amount of flavoring component. The use of sorbitol to absorb the flavoring component is advantageous as thereby the flavor is stabilized and prevented from vaporizing. Another technique is to incorporate the volatile flavoring component into a melt containing a sugar, or sugars, such as dextrose, sucrose, maltose, lactose, fructose, etc. and allowing the mass to cool and set to an amorphous solid. Such solid flavoring compositions disclosed in the patent application of B. Makower and T. H. Schultz, Ser. No 406,368, filed January 26, 1954, are preferred as the flavor is "locked in" the amorphous sugar and so protected from vaporization and deterioration. As an alternative, the volatile flavoring component can be sealed in a capsule made of gelatin, methyl cellulose or other water-soluble material and placed in the package together with the dehydrated product. Another technique is to add to the concentrate, prior to dehydration, a volatile flavoring component in such proportion that after loss by volatilization during dehydration enough of the flavoring component will remain to give the final product a natural flavor and odor.

The flavoring substance which is used for incorporation with the sorbitol may be obtained in various ways. For example the vapors evolved during concentration and/or dehydration of the original juice may be treated to recover the vaporized flavoring substances contained therein. Apparatus and processes for accomplishing such ends are well known to those skilled in the art. This technique is particularly adapted for use with such fruit juices as apple, pear, grape, strawberry, raspberry, cherry, pineapple, etc. If desired, the original juice may be subjected to a special operation such as stripping at atmospheric pressure for the deliberate removal of volatile flavoring substances from the juice prior to carrying out the dehydration. Such a technique is preferable because the volatile essences are recovered from a relatively smaller volume of vapor than in the system where the primary aim is concentration or dehydration. The volatile essence recovered from the vapors evolved in stripping, concentration, or dehydration are preferably purified and concentrated so that they will emulsify properly with the molten sorbitol and yield flavor-stabilized compositions. A great deal of the water in the essences can be removed by distillation in efficient rectifying columns. Further purification to remove water and low-molecular weight alcohols can be accomplished by extracting the flavoring components from the distilled essence with isopentane or other hydrocarbon solvent in which water and low molecular weight alcohols are essentially insoluble. Also to achieve proper emulsification of the purified flavoring substances with the molten sorbitol, an edible oil such as rice oil may be incorporated with the flavoring substance prior to admixture with the molten sorbitol. This technique of recovery of the volatile essences from vapors evolved in concentration or dehydration, followed by purification and concentration of the essence is particularly adapted for use with non-citrus products such as apple, pear, grape, peach, pineapple, cherry, raspberry, strawberry, prune, plum, and the like. In the case of citrus products, it is preferred to use peel oil of the citrus fruit in question as the flavoring substance rather than recovering the flavoring components from the vapors evolved in evaporation treatments. Thus for the flavor enhancement of dehydrated orange juice, the preferred flavoring ingredient is cold-pressed orange peel oil which is actually the substance which gives fresh orange juice its characteristic flavor. Similarly, grapefruit peel oil would be use for dehydrated grapefruit juice, lemon peel oil for dehydrated lemon juice, and so forth. The citrus peel oils are naturally in a concentrated state and can be directly emulsified with the molten sorbitol or molten sugar as described above.

It is often desirable to add sulphur dioxide or other sulphiting agent to the liquid being treated to stabilize the final product and prevent browning during processing and storage of the finished article, particularly if stored at elevated temperatures. To this end sulphur dioxide, sodium sulphite or bisulphite is added in such amount that the dehydrated product will contain about 50 to 500 p. p. m. of $SO_2$. A convenient point to add the sulphite or bisulphite is to the liquid concentrate prior to dehydration. If necessary, ascorbic acid or fat-stabilizing antioxidants such as those listed below may be added to the final product or to the liquid at any stage in the processing to prevent oxidation of flavoring and/or other oxidizable components. A convenient plan for adding the antioxidant is to incorporate it together with the flavoring substance and sorbitol or sugar in preparing the composition for fortifying the flavor of the dehydrated product. Addition of the antioxidant to the sorbitol or sugar flavoring component composition will further minimize the possibility of loss in flavor of the final product, that is, the mixture of dehydrated fruit or vegetable solids and the flavoring agent-sorbitol composition. In general, the amount of antioxidant applied may be from about 0.001% to about 0.1% of the weight of the fruit or vegetable solids. Suitable antioxidants are, for example:

Tocopherols, i. e., alpha-, beta-, and gamma-tocopherol.
Gum guaiac.
Nordihydroguaiaretic acid.
Gallic acid and its esters as for example, the propyl, butyl, amyl, hexyl, octyl, dodecyl, tetradecyl, hexadecyl, and octadecyl esters.
Ascorbic acid and isoascorbic acid and their esters, as for example, ascorbyl or isoascorbyl palmitate, stearate, and so forth.
Thiodipropionic acid and its esters, as for example, the dioctyl and the didodecyl esters.
Phenolic derivatives, as for example, butylated hydroxyanisole; catechol monobenzoate; 2-tert-butyl, 4-methoxy phenol; p-tert-butyl catechol; 2,4-dimethyl-6-tert-butyl phenol, dibenzyl catechol; octyl cresol; 2,7-dihydroxy naphthalene; 2,5-dihydroxy diphenyl; and so forth.
Hydroquinone derivatives, as for example, 2,5-ditert-butyl hydroquinone; 2,5-dibenzyl hydroquinone; 2,5-ditert-amyl hydroquinone; 2,5-bis(dimethylaminomethyl) hydroquinone; 2,5-bis(dimethylaminomethyl) quinone; 2,5-bis(dimethylaminomethyl)-3,6-di-tert butyl hydroquinone; 2,5-bis(dimethylaminomethyl)-3,6-di-tert amyl hydroquinone; 2,5 - bis(dimethylaminomethyl)-3,6-di-tert amyl quinone; and so forth.
Quinoline derivatives, as for example, 6-ethoxy-2,2,4-trimethyl-1,2-dihydroquinoline; 6 - phenyl-2,2,4-trimethyl-1,2-dihydroquinoline; 2,2,4 - trimethyl-1,2-dihydroquinoline; etc.
Hydrocaffeic acid and its esters, for example, ethyl hydrocaffeate.
Pyrogallol derivatives, as for example, 4-acetyl pyrogallol; 4-propionyl pyrogallol; 4-butyryl pyrogallol; 4-valeryl pyrogallol; 4-isovaleryl pyrogallol; 4-(diethylacetyl) pyrogallol; 4-acetyl-6-ethyl pyrogallol; 4-acetyl-6-tert. butyl pyrogallol; and so forth.

The dry product which preferably contains not more than about 4% moisture, is packaged in tin cans or other containers which can be sealed to an air tight condition. It is obvious that since the product is virtually completely dehydrated it is not perishable and may be kept indefinitely at room temperature or higher. For constitution the calculated amount of water is dumped onto the dehydrated product and after agitation for a few seconds is ready to serve.

In packaging the dehydrated products it is often advantageous to insert in the sealed package a water-vapor permeable container holding a desiccant. The desiccant has the effect of removing the last traces of moisture from the dehydrated product whereby to increase its stability and shelf-life. It is known that for maximum stability some dehydrated products should have a moisture content of less than 1%. However, to obtain such a low moisture level by dehydration would require an excessive period of time and increase the possibility of heat damage. For this reason by the use of a desiccant the powder may be packaged at say 3% moisture content and the desiccant will gradually lower the moisture content of the product to minimum levels during storage. Although it is preferred to use calcium oxide as the desiccant, one may also use calcium chloride, magnesium perchlorate, montmorillonite, calcium sulphate, and the like.

It is a feature of this invention that tomato juice and many other fruit and vegetable juices can be dehydrated without addition of any drying-aid thus to prepare a final dehydrated product which contains 100% of the natural product. However in some cases it may be desirable to add a drying aid to the concentrate prior to dehydration to enhance expansion during dehydration. Many different drying aids can be used, as for example, egg albumen, dextrin, corn syrup solids, gelatin, pectin, sodium carboxymethyl cellulose, methyl cellulose, alkali metal alginates, and so forth.

The invention is demonstrated in greater detail by the following examples:

*Example I*

Fresh tomatoes were washed then broken up and heated to 180° F. to inactivate the enzymes. The heated tomatoes were then passed through a conventional paddle finisher where they were disintegrated and the seeds, skins, and cores removed by screening. The resulting juice was then evaporated under vacuum to produce a concentrate of pasty consistency having a density of 36° Brix.

The tomato juice concentrate was homogenized by passing it through a colloid mill of the type in which the material being treated is forced under high pressure through minute orifices.

The homogenized concentrated juice was then aerated (25% overrun) by beating it for about 5 minutes with a power-rotated wire whip.

The aerated homogenized concentrate was then loaded on trays using a loading of about ½ lb. per sq. ft. The loaded trays were then placed in a refrigerator maintained at 10° F. until the product had assumed this temperature.

The cold trays of concentrate were then rapidly loaded into a vacuum drier equipped with shelves to hold trays of the material to be dried, the shelves being hollow so that heating or cooling media could be circulated therethrough. As soon as the trays had been inserted, the drier was closed and the vacuum applied. A pressure of about 1 mm. Hg was maintained throughout the drying cycle. The shelves of the drier were unheated initially being at approximately 70° F. and maintained at this temperature until full vacuum was obtained (about 6 or 7 minutes). Then the shelf temperature was raised to 200° F. After 30 min. the shelf temperature was lowered to 180° F. and finally after 30 more minutes the shelf temperature was lowered to 160° F. and kept at this level for 45 minutes when the drying cycle was complete. Cold water was then circulated through the shelves to cool the product and then the vacuum was broken and the drier opened and the product removed.

It was observed that the concentrate expanded about 10 times in volume during dehydration, retaining this expanded volume in the final product thus to yield a dry product which was porous, easy to remove from the trays and which broke up readily into free-flowing crystalline flakes. Upon stirring the product for a few seconds with water there was formed a reconstituted tomato juice which had the taste of freshly prepared juice and which also had the appearance and consistency of freshly prepared tomato juice in that the pulp particles were completely dispersed throughout the liquid as minute particles which remained suspended and did not settle out on standing.

*Example II*

Concentrated tomato juice having a solids content of 36% was homogenized then aerated to the extent of 45% overrun. The aerated concentrate, at room temperature, was loaded on trays using a loading of about ½ lb. per sq. ft. The loaded trays were quickly placed in a vacuum drier of the type described in Example I. The drier was closed and the vacuum applied. No heat was applied initially; the drier shelves were at about 75° F. About 6 minutes after closing the door, the pressure in the drier had fallen to 1 mm. Hg and the temperature of the concentrate was below about 10° F. At this point, a heating medium was circulated through the hollow shelves until these had attained a temperature of 150° F. This temperature was maintained for 3 hours when the product was dry. The pressure inside the drier was maintained at 1 mm. Hg throughout the dehydration. After the 3rd hour cold water was circulated through the hollow shelves to cool the product. The vacuum was then broken and the product removed.

It was observed that the concentrate expanded to about 10 times its original volume then decreased to about 5 times its original volume while full vacuum was being attained in the drier. Once full vacuum was attained there was no further appreciable change in volume of the concentrate throughout the drying cycle. The dry product was porous, easy to remove from the trays, and could be readily broken up into free-flowing crystalline flakes. Upon stirring the product with water for a few seconds there was formed a reconstituted juice which had the color, taste, appearance, and consistency of freshly prepared tomato juice.

*Example III*

A lot of commercial apple sauce was evaporated under vacuum to a density of 38° Brix. The apparatus used was an evaporator provided with a cylindrical heated surface and a rapidly rotating paddle which continuously spread the sauce in a thin film on the heated surface and gradually moved it toward an outlet as evaporation proceeded. Using this apparatus, the sauce was homogenized during the evaporation. The apple sauce concentrate was then cooled to 10° F. and aerated to the extent of about 20% overrun. The aerated concentrate was quickly recooled to 10° F. in an air-blast freezer and the chilled concentrate loaded on trays and placed in a vacuum drier of the type described in Example I. The door of the drier was closed and vacuum applied. No heat was used, the drier shelves were at room temperature. After about 6 minutes the pressure in the drier was decreased to 1 mm. Hg and the temperature of the concentrate was 0° F. At this point a heating medium was circulated through the shelves until these had reached 130° F. This temperature was maintained for 5 hours by which time the product was dehydrated. The product was then cooled by circulating cold water through the shelves, the vacuum was broken and the product removed.

It was noted that the concentrate expanded about 5 times in volume during the dehydration and retained this volume throughout the process. The product was a porous mass which could be easily removed from the trays and which broke up easily into free-flowing crystalline flakes. A reconstituted apple sauce of good flavor and normal consistency was produced by stirring the flakes with cold water for a few seconds.

Having thus described the invention, what is claimed is:

1. A process for preparing solid dehydrated products from a liquid foodstuff which comprises concentrating such material to produce a liquid concentrate, incorporating a gas in the liquid concentrate, subjecting the gasified liquid concentrate to vacuum dehydration, initially conducting the dehydration without application of heat until the liquid concentrate is substantially expanded in volume and is partly dehydrated, then applying heat and completing the dehydration under conditions of applied heat and vacuum while maintaining the product in its expanded condition.

2. The process of claim 1 wherein the gasified liquid concentrate is chilled prior to dehydration.

3. The process of claim 1 wherein the liquid concentrate is homogenized prior to dehydration.

4. A process for preparing solid dehydrated products from tomato juice without separation of pulp from the juice which comprises concentrating tomato juice having a normal pulp content to produce a liquid concentrate, incorporating a gas in the liquid concentrate, subjecting the gasified liquid concentrate to vacuum dehydration, initially conducting the dehydration without application of heat until the liquid concentrate is substantially expanded in volume and is partly dehydrated, then applying heat and completing dehydration under conditions of applied heat and vacuum while maintaining the product in its expanded condition.

5. The process of claim 4 wherein the gasified liquid concentrate is chilled prior to dehydration.

6. The process of claim 4 wherein the liquid concentrate is homogenized prior to dehydration.

7. A process for preparing solid dehydrated products from a liquid foodstuff which comprises concentrating such material to produce a liquid concentrate, incorporating a gas in the liquid concentrate, subjecting the gasified liquid concentrate to vacuum dehydration, initially conducting the dehydration without application of heat until the liquid concentrate is substantially expanded in volume, is partly dehydrated, and assumes a stiff plastic to solid condition, and a temperature below about 32° F., then applying heat and completing the dehydration under conditions of applied heat and vacuum.

8. The process in accordance with claim 7 wherein the gasified liquid concentrate is chilled prior to dehydration.

9. A process for preparing solid dehydrated products from tomato juice without separation of pulp from the juice which comprises concentrating tomato juice having a normal pulp content to produce a liquid concentrate having about 35% solids content, incorporating a gas in the liquid concentrate, subjecting the gasified liquid concentrate to vacuum dehydration, initially conducting the dehydration without application of heat until the liquid concentrate temperature falls below about 20° F., then applying heat and completing the dehydration under conditions of applied heat and vacuum.

10. The process of claim 9 wherein the gasified liquid concentrate is chilled prior to dehydration.

11. A process for preparing solid dehydrated products from liquid foodstuffs which comprises subjecting a concentrated, gasified liquid foodstuff solely to vacuum until the concentrate assumes an expanded, partly dehydrated, chilled, and thickened state such that if heat is applied it will not collapse in volume, then applying heat and completing the dehydration under conditions of applied heat and vacuum.

12. The process of claim 11 wherein the liquid foodstuff is tomato juice.

13. The process of claim 11 wherein the concentrated, gasified liquid foodstuff is cooled to a chilled but still fluid state prior to application of the vacuum.

14. The process of claim 11 wherein the liquid foodstuff is apple sauce.

15. A process for preparing solid dehydrated products from a liquid foodstuff which comprises concentrating such material to produce a liquid concentrate, incorporating a gas into the liquid concentrate, subjecting the gasified liquid concentrate to vacuum dehydration, initially conducting the dehydration solely by application of vacuum, continuing such conditions until the liquid concentrate is substantially expanded and its temperature falls to below about 32° F., then applying heat and completing the dehydration under conditions of applied heat and vacuum.

16. The process of claim 15 wherein the liquid foodstuff is tomato juice.

17. The process of claim 15 wherein the gasified concentrate prior to dehydration is cooled to a chilled but still fluid state.

18. The process of claim 15 wherein the liquid foodstuff is apple sauce.

References Cited in the file of this patent

UNITED STATES PATENTS 2,645,580  Schultz _____ July 14, 1953

OTHER REFERENCES

Article, "Sublimation Method of Dehydration," pub. in Food Manufacture, March 1944, vol. XIX, No. 3, page 77.

Article, "Drying By Sublimation," by Earl W. Flosdorf, pub. in Food Industries, January 1945, pages 92 to 95, 168, 170, 172, 174, 176 and 178.

Article, "Vacuum Freeze Drying," by H. H. Chambers, Manufacturing Chemist & Man. Perfumer, February 1949, XX, 2 pages, 75, 76, 77.